United States Patent Office 2,943,975
Patented July 5, 1960

2,943,975
NEW PHOSPHORIC ESTERS

Jean Metivier, Arpajon, France, assignor to Societe des Usines Chimiques Rhone-Poulenc, Paris, France, a corporation of France No Drawing. Filed Oct. 9, 1959, Ser. No. 845,318

Claims priority, application France Nov. 7, 1958

12 Claims. (Cl. 167—22)

This invention relates to phosphoric esters, to a process for their preparation and to pesticidal compositions containing them.

The present invention provides new phosphoric esters of the general formula:

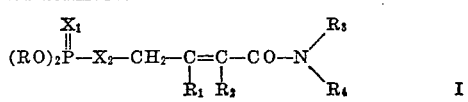

wherein R represents a lower alkyl group, $X_1$ and $X_2$ are the same or different and represent oxygen or sulphur atoms, and $R_1$, $R_2$, $R_3$, and $R_4$ are the same or different and represent hydrogen atoms or lower alkyl groups.

The term "lower alkyl group" is used herein to denote alkyl groups containing from 1 to 4 carbon atoms.

According to a feature of the invention these esters are prepared by condensing a salt of a phosphoric acid of the general formula:

with a compound of the general formula:

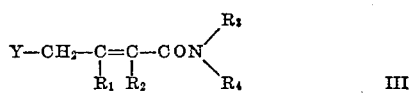

(wherein Y represents a reactive ester residue such as a halogen atom or a sulphuric or sulphonic ester residue and R, $X_1$, $X_2$, $R_1$, $R_2$, $R_3$, and $R_4$ are as hereinbefore defined).

The phosphorus derivative of Formula II is preferably employed in the form of an alkali metal salt, which may if desired be prepared in situ, an ammonium salt or a salt with a tertiary organic base, for example pyridine.

The reaction is preferably carried out in an organic solvent medium and more particularly in an alcohol such as ethanol, a ketone such as acetone or methyl ethyl ketone, an ester such as ethyl acetate, a nitrile such as acetonitrile, or an aromatic hydrocarbon such as benzene or toluene, and at a temperature between room temperature and 120° C.

When $X_1$ and $X_2$ in Formula II represent a sulphur atom and an oxygen atom respectively (the thiolo form), there is obtained by this method an ester of Formula I wherein $X_1$ and $X_2$ represent an oxygen atom and a sulphur atom respectively (the thiolo form). This transposition is quantitative.

The new phosphoric esters of the invention exhibit outstanding pesticidal properties, particularly as insecticides and acaricides.

The present invention also relates to pesticidal compositions containing a phosphoric ester of general Formula I in association with one or more diluents compatible therewith. The compositions may be solid if a compatible powdered solid diluent is used such as talc, magnesia, kieselguhr, tricalcium phosphate, cork powder, absorbent charcoal or a clay such as kaolin or bentonite, the quantity of phosphoric ester being preferably between 0.005 and 50% by weight of the compositions. In place of a solid there may be used a liquid in which the phosphorus derivative is dissolved or dispersed, its content being preferably between 0.005 and 50% by weight of the composition. The composition may thus be in the form of an aerosol, a suspension, an emulsion or a solution in an organic or aqueous-organic medium, for example an aromatic hydrocarbon, such as toluene or xylene, a mineral or vegetable oil or a mixture of these diluents. Compositions in the form of dispersions, solutions or emulsions may contain ionic or non-ionic wetting, dispersing or emulsifying agents, for example sulphoricinoleates, quaternary ammonium derivatives or products based on condensates with ethylene oxide, such as condensates of ethylene oxide with octylphenol or fatty acid esters of anhydrosorbitols which have been solubilised by etherification of the free hydroxy groups by condensation with ethylene oxide. It is preferable to use non-ionic agents because they are insensitive to electrolytes. When emulsions are required the phosphorus derivatives may be used in the form of self-emulsifying concentrates containing the active substance dissolved in the dispersing agent or in a solvent compatible with the said agent, a simple addition of water providing compositions ready for use.

The solid compositions are preferably prepared by grinding the phosphorus derivative with the solid diluent or by impregnation of the solid diluent with a solution of the phosphorus derivative in a volatile solvent, followed by evaporation of the solvent and, if necessary, grinding the product to obtain a powder.

These new compounds may be used in admixture with other pesticides, including substances producing a synergistic effect.

The following examples illustrate the invention.

Example I

To a suspension of sulphur (7.2 g.) in a mixture of diethylphosphite (34.5 g.) in ethanol (75 cc.) is added gradually a solution (90 cc.) of 2.5 N sodium ethoxide in ethanol.

After the reaction mixture has stood for one hour at room temperature, 4-chlorocrotonamide (23.9 g.) is added and the mixture is heated for 6 hours under reflux. After removal by filtration of the sodium chloride formed the ethanol is distilled off under reduced pressure. The oily residue obtained (59 g.) is treated with distilled water (150 cc.). After treatment with decolourising charcoal and filtration, the aqueous solution is extracted with chloroform (3 x 100 cc.). The combined chloroform extracts are dried over sodium sulphate and concentrated under reduced pressure until no more solvent remains. The residue obtained weighs 41 g. and analysis shows that it is 4-O,O-diethylthiolophosphorylcrotonamide.

Example II

To a solution of potassium O,O-diethyldithiophosphate (17.9 g.) in acetone (60 cc.) is added 4-chlorocrotonamide (9 g.) and the mixture is agitated for two hours at room temperature and then heated for one hour under reflux. The potassium chloride formed is removed by filtration and the acetone solution is concentrated under reduced pressure. The oil obtained is dissolved in benzene (150 cc.) and the solution obtained is washed with distilled water (50 cc.), with a saturated solution of sodium bicarbonate (50 cc.) and finally again with distilled water (4 x 50 cc.). After drying over sodium sulphate and treating with decolourising charcoal, concentration under reduced pressure until the solvent has disappeared yields a viscous oil (15.2 g.) which analysis shows to be 4-O,O-diethyldithiophosphorylcrotonamide.

The 4-chlorocrotonamide which serves as starting material in Example I and II is prepared by the method of Lespieau, Bul. Soc. Chim., 33, 466 (1905).

*Example III*

To a solution of potassium O,O-diethyldithiophosphate (24.6 g.) in acetone (80 cc.) is added N-methyl-4-chlorocrotonamide (14 g.) and the mixture is agitated for 5 hours at room temperature. After removal by filtration of the potassium chloride formed the mixture is treated as in Example II and an oil (24 g.) is obtained whose analysis shows it to be N-methyl-4-O,O-diethyldithiophosphorylcrotonamide.

The N-methyl-4-chlorocrotonamide which serves as a starting material as prepared by the action of monomethylamine on 4-chlorocrotonyl chloride prepared by the method of Broche and Rambaud, C.R. Acad. Sci., 218, 880 (1944). N-methyl-4-chlorocrotonamide melts at 96° C. after crystallisation from benzene.

*Example IV*

To a solution of potassium O,O-diethyldithiophosphate (34. g.) in acetone (140 cc.) is added N,N-diethyl-4-chlorocrotonamide (23 g.). After 3 hours agitation at room temperature and 1 hour's heating under reflux, the mixture is treated as in Example II and an oily product (37 g.) is obtained, which analysis shows to be N,N-diethyl-4-O,O-diethyldithiophosphorylcrotonamide.

The N,N-diethyl-4-chlorocrotonamide which serves as starting material is prepared by the action of 4-chlorocrotonyl chloride upon diethylamine. It distils at 106–107° C./1.5 mm. Hg.

*Example V*

To a solution of potassium O,O-diethyldithiophosphate (26.4 g.) in acetone (120 cc.) is added N,N-dimethyl-4-chlorocrotonamide (16 g.). After 12 hours standing at room temperature the mixture is treated as indicated in Example II and an oily product (27 g.) is obtained which analysis shows to be N,N-dimethyl-4-O,O-diethyldithiophosphorylcrotonamide.

The N,N-dimethyl-4-chlorocrotonamide which serves as starting material is prepared by the action of dimethylamine upon 4-chlorocrotonyl chloride. It is a liquid boiling at 113–114° C./3.5 mm. Hg.

*Example VI*

To a solution of potassium O,O-diethyldithiophosphate (23.3 g.) in acetone (110 cc.) is added N-isopropyl-4-chlorocrotonamide (15.4 g.). After 12 hours standing at room temperature followed by treatment as in Example II, a yellow oil is obtained (26.5 g.), which analysis shows to be N-isopropyl-4-O,O-diethyldithiophosphorylcrotonamide.

The N-isopropyl-4-chlorocrotonamide is prepared by the action of monoisopropylamine upon 4-chlorocrotonyl chloride. It is a solid melting at 86° C.

*Example VII*

To acetonitrile (150 cc.) is added N-methyl-4-chlorocrotonamide (20 g.) and ammonium O,O-diethylthionophosphate (32.6 g.) and the mixture is heated for 3 hours at 50–55° C. After removal by filtration of the ammonium chloride formed, followed by treatment as in Example I, an oil (37 g.) is obtained, which analysis shows to be N-methyl-4-O,O-diethylthiolophosphorylcrotonamide.

*Example VIII*

To acetonitrile (100 cc.) is added 98% ammonium O,O-diethylthionophosphate (19.5 g.) and N,N-dimethyl-4-chlorocrotonamide (13.5 g.). After 4 hours heating at 50–55° C. followed by treatment as in Example I, N,N-dimethyl-4-O,O-diethylthiolophosphorylcrotonamide (23 g.) is obtained as a yellow oil.

*Example IX*

To acetonitrile (100 cc.) is added ammonium O,O-diethylthionophosphate (25.5 g.) and N-ethyl-4-chlorocrotonamide (14.7 g.) and the mixture is heated at 50° C. for 4 hours.

After treatment as in Example I, N-ethyl-4-O,O-diethylthiolophosphorylcrotonamide (26.5 g.) is obtained in the form of a yellow oil.

The N-ethyl-4-chlorocrotonamide which serves as starting material is prepared by the action of monoethylamine upon 4-chlorocrotonyl chloride. After recrystallisation from water N-ethyl-4-chlorocrotonamide melts at 80° C.

*Example X*

To suspension of N-methyl-4-chlorocrotonamide (26.6 g.) in water (100 cc.) ammonium O,O-dimethylthionophosphate (38.4 g.) is added and the mixture is stirred for five hours at room temperature and then heated for one hour to 80° C. The solution obtained is extracted with methylene chloride (4 x 100 cc.), and the extract is dried with sodium sulphate, treated with decolorising charcoal and evaporated under reduced pressure. A viscous oil (34 g.) remains, which analysis shows to be N-methyl-4-O,O-dimethylthiolophosphorylcrotonamide.

*Example XI*

To a solution of N-methyl-4-O,O-diethylthiolophosphorylcrotonamide (20 g.) in xylene (25 cc.) is added 10 g. of a condensation product of 10 molecular proportions of ethylene oxide and one molecular proportion of octylphenol and the mixture is made up to 100 cc. with xylene.

The solution obtained is diluted with water (100 litres). This aqueous solution sprayed upon apple trees infested with green aphids leads to the total destruction of the latter.

*Example XII*

To a solution of N-ethyl-4-O,O-diethylthiolophosphorylcrotonamide (10 g.) in acetone (20 cc.) is added the wetting agent (5 cc.) described in Example XI.

The solution obtained by dilution with water (50 litres) is used to treat French Bean plants infested with red spider.

*Example XIII*

To a solution of 4-O,O-diethyldithiophosphorylcrotonamide (30 g.) in xylene (50 g.) is added sodium dioctylsuccinate sulphonate (15 g.) and the mixture is made up to 100 cc. with xylene. The solution obtained is dispersed in water (100 litres).

The emulsion thus prepared may be used against aphids and red spider.

I claim:

1. A member of the class consisting of the phosphoric esters of the general formula:

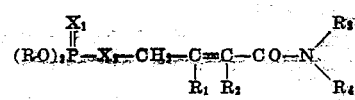

wherein R represents a lower alkyl group, $X_1$ and $X_2$ are chosen from the group consisting of oxygen and sulphur, and $R_1$, $R_2$, $R_3$, and $R_4$ are chosen from the group consisting of hydrogen atoms and lower alkyl groups.

2. 4-O,O-diethylthiolophosphorylcrotonamide.

3. 4-O,O-diethyldithiophosphorylcrotonamide.

4. N-methyl-4-O,O-diethyldithiophosphorylcrotonamide.
5. N,N-diethyl-4.O,O-diethyldithiophosphorylcrotonamide.
6. N,N-dimethyl-4-O,O-diethyldithiophosphorylcrotanamide.
7. N-isopropyl-4-O,O-diethyldithiophosphorylcrotonamide.
8. N-methyl-4-O,O-diethylthiolophosphorylcrotonamide.
9. N,N-dimethyl-4-O,O-diethylthiolophosphorylcrotonamide.
10. N-ethyl-4-O,O-diethylthiolophosphorylcrotonamide.
11. N-methyl-4-O,O-dimethylthiolophosphorylcrotonamide.
12. A pesticidal composition comprising at least one member of the class consisting of the phosphoric esters of the general formula:

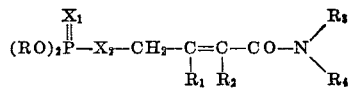

wherein R represents a lower alkyl group, $X_1$ and $X_2$ are chosen from the group consisting of oxygen and sulphur, and $R_1$, $R_2$, $R_3$, and $R_4$ are chosen from the group consisting of hydrogen atoms and lower alkyl groups in association with at least one diluent compatible therewith.

References Cited in the file of this patent
UNITED STATES PATENTS
2,802,855   Whetstone _____ Aug. 13, 1957